C. ATHERTON.
PLAITING MECHANISM.
APPLICATION FILED SEPT. 13, 1915.
1,282,360.
Patented Oct. 22, 1918.
8 SHEETS—SHEET 1.
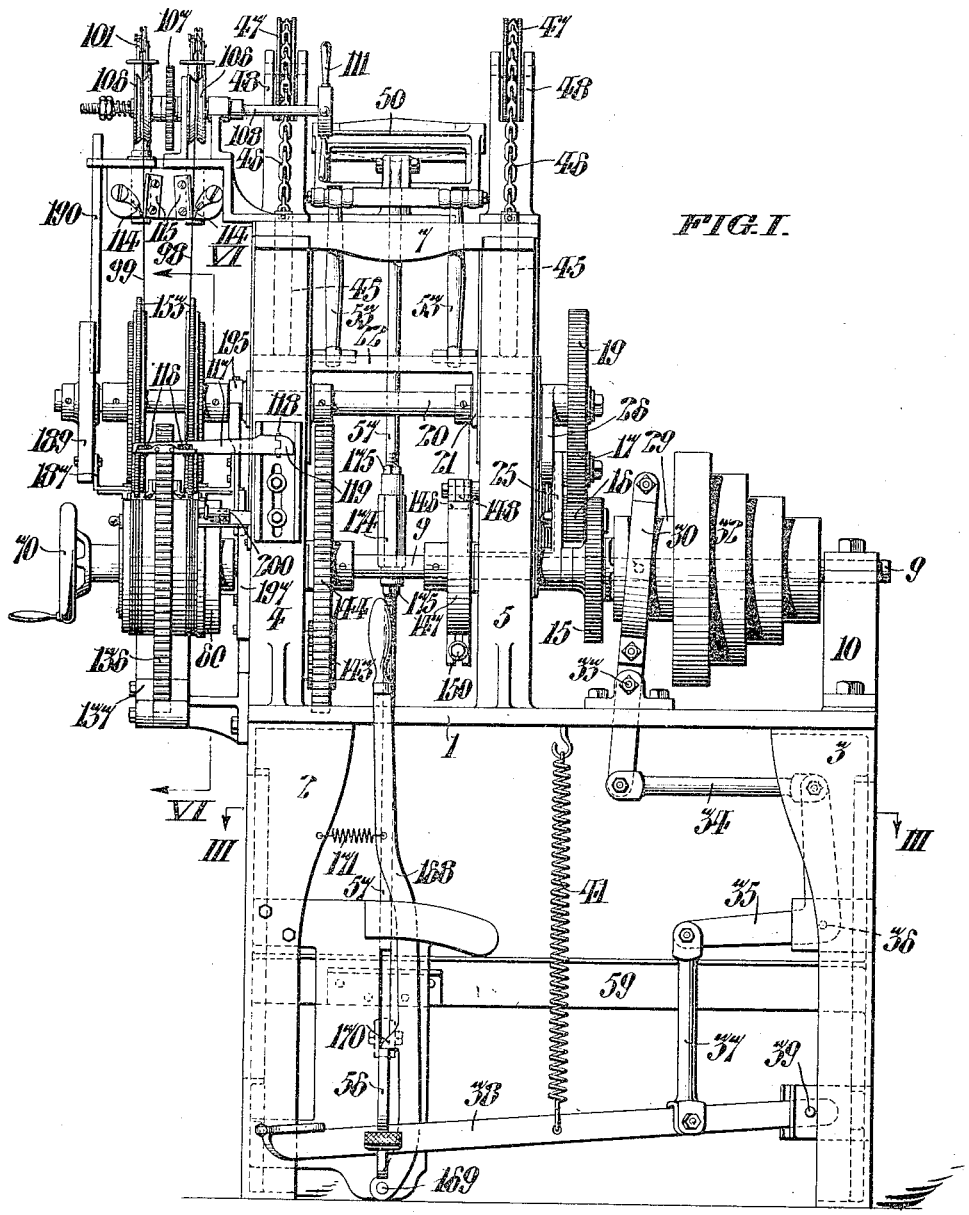
FIG. I.
WITNESSES:
Philip W. Vessey
Frank E. Paige
INVENTOR:
CHARLES ATHERTON,
Attorney.

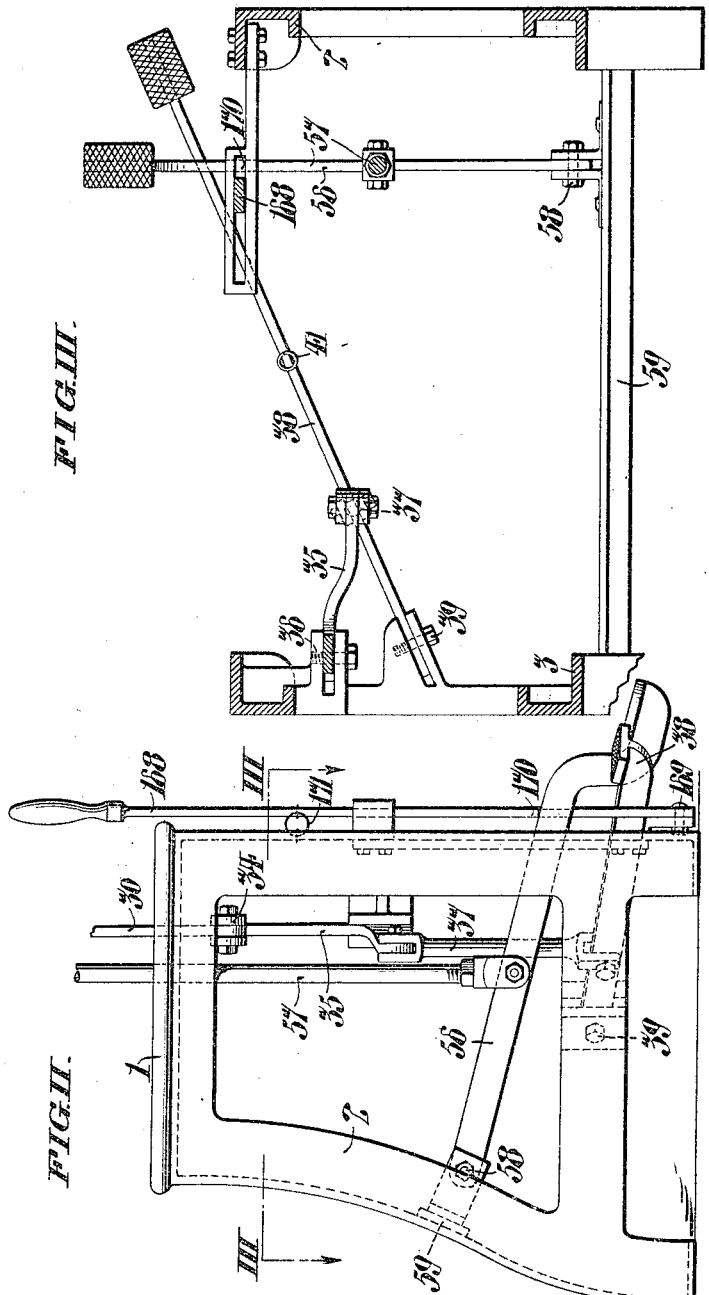

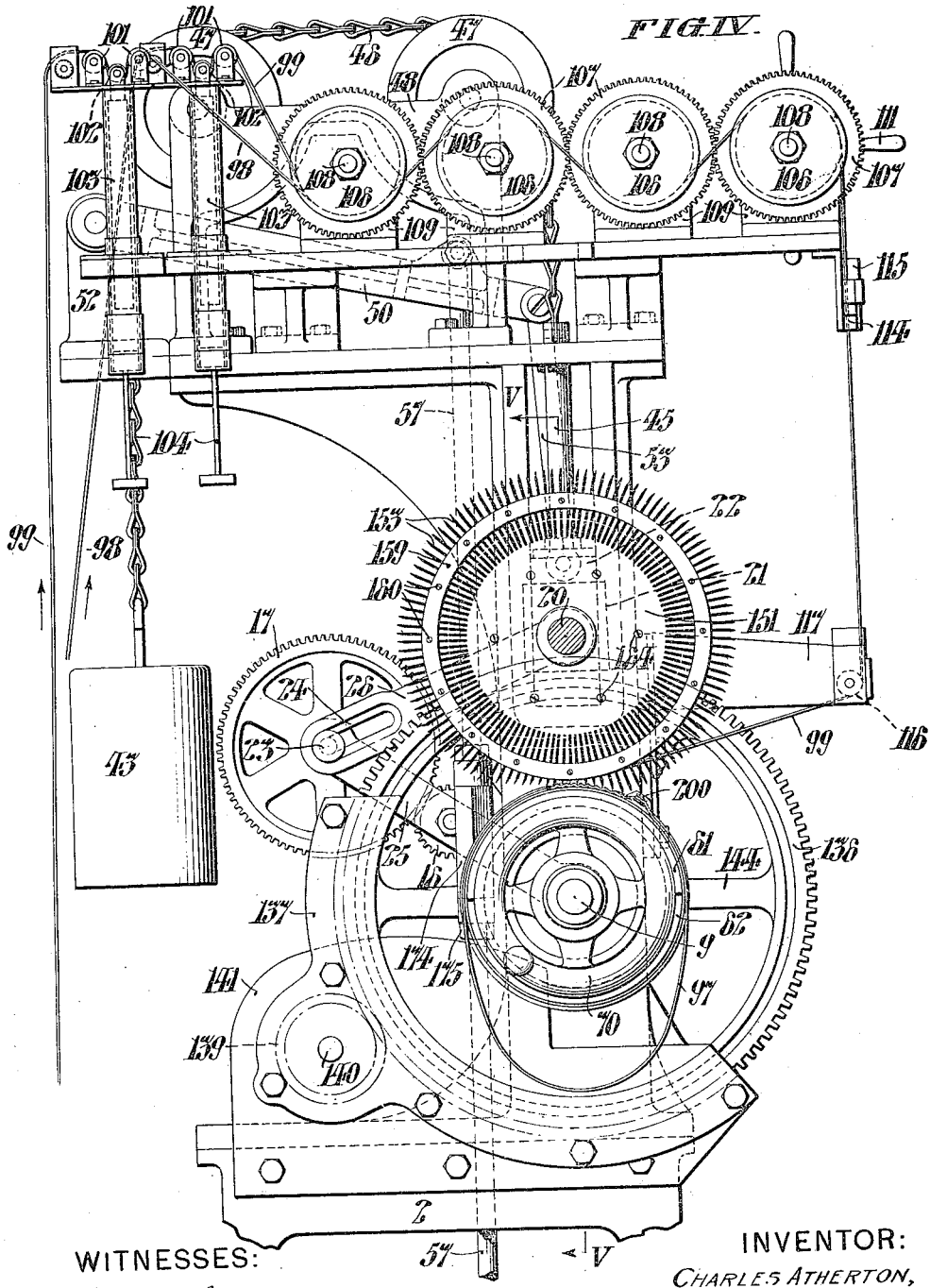

C. ATHERTON.
PLAITING MECHANISM.
APPLICATION FILED SEPT. 13, 1915.
1,282,360.
Patented Oct. 22, 1918.
8 SHEETS—SHEET 4.
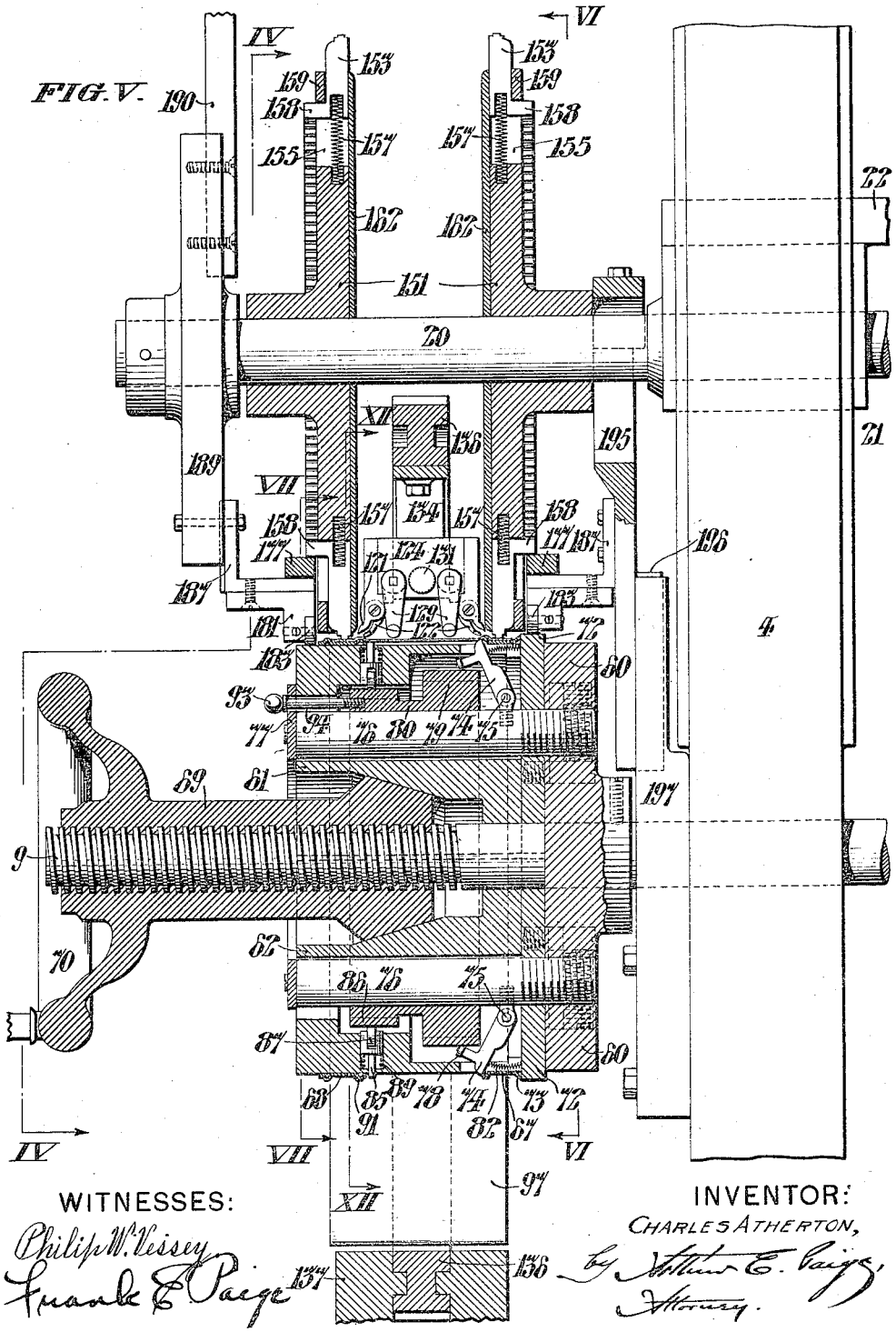
WITNESSES:
INVENTOR:
CHARLES ATHERTON,

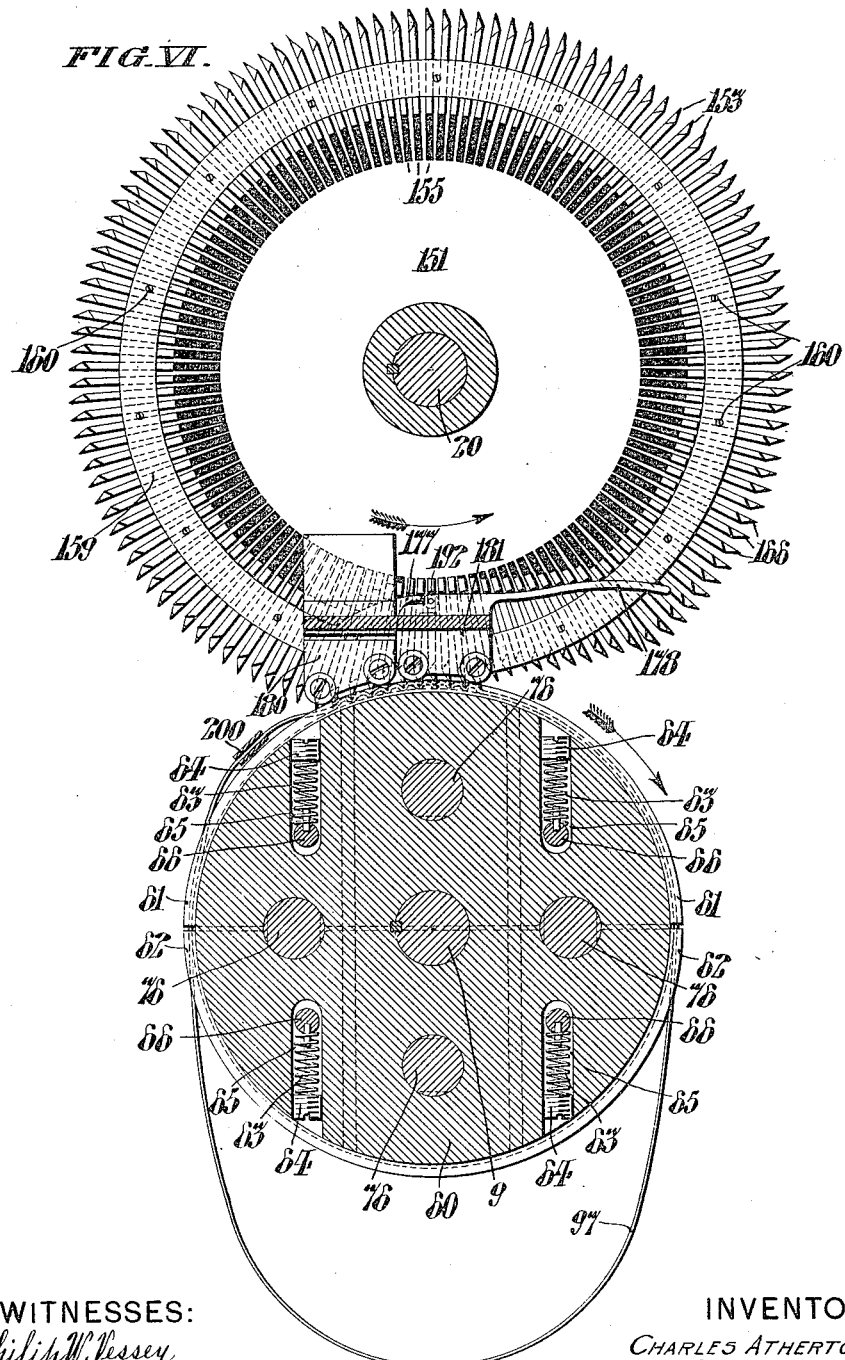

C. ATHERTON.
PLAITING MECHANISM.
APPLICATION FILED SEPT. 13, 1915.
1,282,360.
Patented Oct. 22, 1918.
8 SHEETS—SHEET 6.
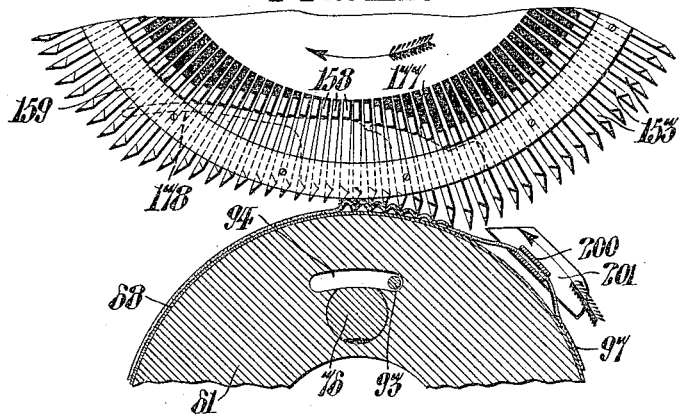
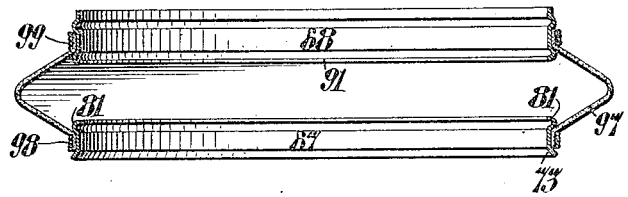
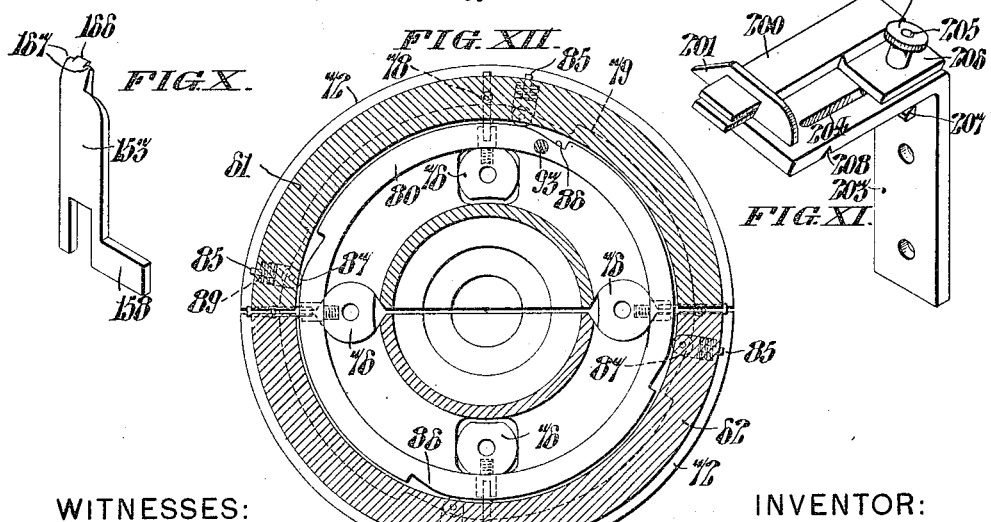
WITNESSES:
Philip W. Vessey
Frank E. Paege
INVENTOR:
CHARLES ATHERTON,
by Arthur E. Paige,
Attorney.

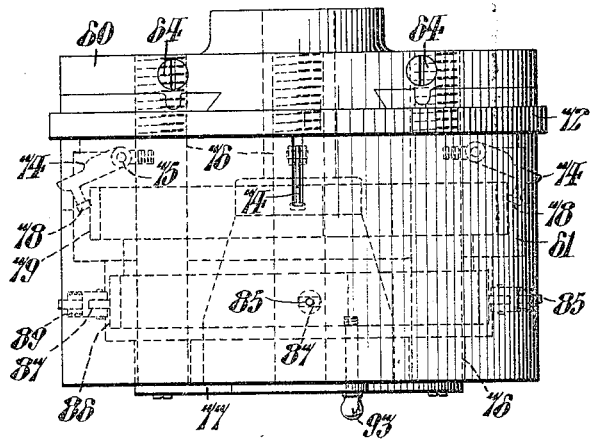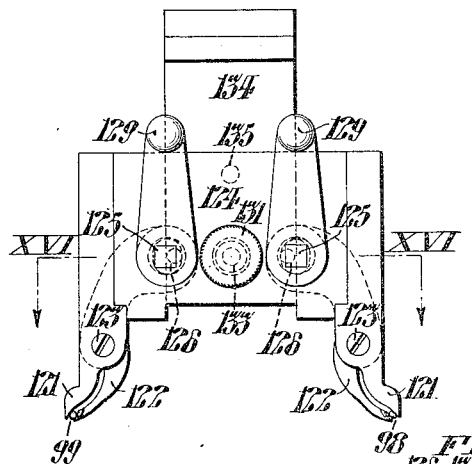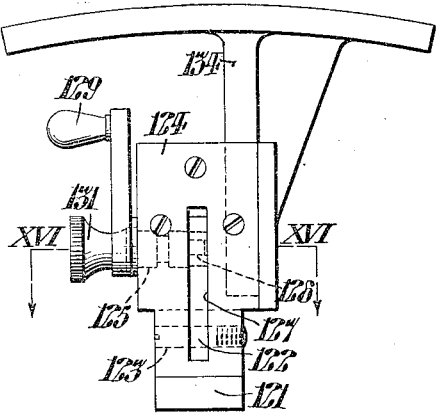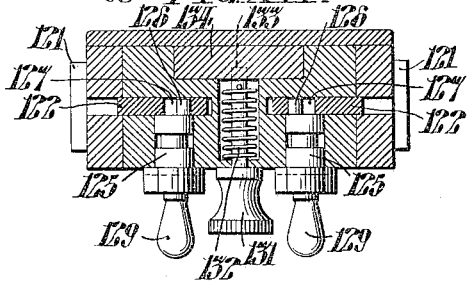

C. ATHERTON.
PLAITING MECHANISM.
APPLICATION FILED SEPT. 13, 1915.
1,282,360.
Patented Oct. 22, 1918.
8 SHEETS—SHEET 8.
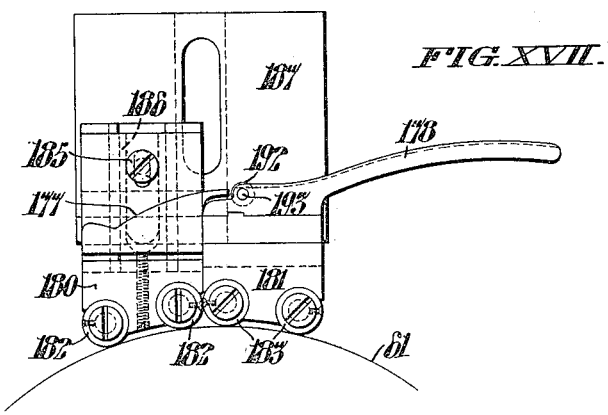
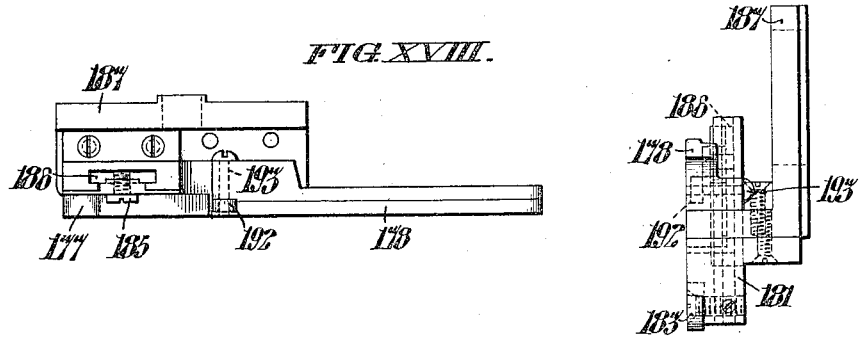
WITNESSES:
Philip W. Vessey
Frank E. Paege
INVENTOR:
CHARLES ATHERTON,
by Arthur E. Paige
Attorney.

UNITED STATES PATENT OFFICE.

CHARLES ATHERTON, OF PHILADELPHIA, PENNSYLVANIA, ASSIGNOR TO JOHN GRIBBEL, OF PHILADELPHIA, PENNSYLVANIA.

PLAITING MECHANISM.

1,282,360.

Specification of Letters Patent.

Patented Oct. 22, 1918.

Application filed September 13, 1915. Serial No. 50,342.

*To all whom it may concern:*

Be it known that I, CHARLES ATHERTON, a citizen of the United States, residing at Philadelphia, in the State of Pennsylvania, have invented a certain new and useful Improvement in Plaiting Mechanism, whereof the following is a specification, reference being had to the accompanying drawings.

My invention relates to mechanism of the class shown in Letters Patent of the United States 931,755 granted to John Gribbel and myself August 24, 1909 and is particularly designed for employment in the manufacture of bellows for gas meters; comprising metallic rings connected by a flexible tube of leather. Said flexible tube is primarily of uniform diameter and larger than the rings to which it is to be attached, and the machine hereinafter described is used to plait the ends of said tube so as to fit them to said rings and bind them to the latter.

The form of my invention hereinafter described comprises an expansible chuck arranged to detachably engage and rotate two bellows rings and to hold a flexible bellows tube on said rings; two rotary plaiting disks, each comprising a peripheral series of radially reciprocatory blades which successively engage and are shifted radially inward by the web of said tube when rotated in contact therewith, so as to corrugate and gather the axially opposite ends of said web in circumferential series of plaits, thus reducing the circumference of said web to fit said rings; and means are provided to wrap respective binder cords around the reduced flexible ends of said tube to secure it upon said rings.

My invention includes the various novel features of construction and arrangement hereinafter more definitely specified.

In said drawings; Figure I is a front elevation of a machine conveniently embodying my invention.

Fig. II is a side elevation of the supporting legs and controlling levers of said machine.

Fig. III is a plan sectional view taken on the line III, III, in Figs. I and II, showing said controlling levers.

Fig. IV is a side elevation of the portion of said machine extending above the table shown in Fig. I; the portion of said machine at the left of the line IV, IV, in Fig. V, being omitted.

Fig. V is a fragmentary vertical sectional view taken on the line V, V, in Fig. IV.

Fig. VI is a fragmentary vertical sectional view, taken on the line VI, VI, in Fig. V.

Fig. VII is a fragmentary vertical sectional view, taken on the line VII, VII, in Fig. V.

Fig. VIII is a central sectional view of a bellows completed by the employment of my invention.

Fig. IX is a fragmentary sectional view showing a tubular bellows web plaited on the ring and held by the binding cord.

Fig. X is a perspective view of one of the plaiting blades.

Fig. XI is a perspective view of the guide for the edge of the leather tube, indicated in Figs. I, IV, VI and VII.

Fig. XII is a vertical sectional view of said chuck taken on the line XII, XII, in Fig. V, showing the circumferential series of devices for holding the rings in proper axial position on said chuck during the plaiting operation, and the cam ring in said chuck which is manually turned to and fro therein to alternately engage and release said devices with respect to the rings.

Fig. XIII is a plan view of said chuck.

Fig. XIV is an elevation showing, in gripping position, the mechanism for gripping the binding cords, which is shown in released position in Fig. V.

Fig. XV is an edge view of the mechanism shown in Fig. XIV.

Fig. XVI is a plan sectional view of said mechanism, taken on the line XVI, XVI, in Figs. XIV and XV.

Fig. XVII is an elevation of the adjustable cam mechanism governing the operation of the circumferential series of radial plaiter blades shown in Fig. VI.

Fig. XVIII is a plan view of said cam mechanism shown in Fig. XVII.

Fig. XIX is an elevation of the right side of said cam mechanism as shown in Fig. XVII.

In said drawings; the frame table 1 is supported by the legs 2 and 3 and has the housing standards 4 and 5 supporting the cap plate 7. The main shaft 9 is journaled in said standards 4 and 5 and in the bearing standard 10 and has the gear 15 connected by the pinion 16 and the idler 17 with the gear 19 on the counter-shaft 20 which is journaled in the bearing boxes 21 which are connected by the yoke bar 22 and mounted for vertical reciprocation in said housing standards 4 and 5.

As best shown in Fig. IV; the idler 17 is mounted on the stud 23 which is adjustable in the slot 24 and forms the pivot of the toggle comprising the links 25 and 26 which are respectively mounted to turn on the shafts 9 and 20, whereby said main shaft 9 is operatively connected to rotate the counter-shaft 20 regardless of the vertical reciprocation of the latter.

The driving shaft 9 has the clutch 29 arranged to be axially shifted by the strap lever 30 to engage and release the step pulley 32. Said lever 30 is pivoted at 33, extends below the table 1 and is connected by the link 34 to the bell crank lever 35 which is fulcrumed at 36 in the frame leg 3 and is connected by the link 37 with the pedal lever 38, which is fulcrumed at 39 in said leg 3 and which is depressed to the position shown in Fig. I to operatively connect said step pulley 32 with the shaft 9, under tension of the spring 41 which extends from said lever 38 to the table 1 and is arranged to shift said lever 30 in the opposite direction to disengage said clutch 29 from said pulley 32.

As best shown in Fig. IV; said counter-shaft 20, its bearing boxes 21 and their yoke bar 22 and appurtenances are counter-balanced by the two weights 43 (one hidden behind the other on Fig. IV) which normally maintain said shaft 20 in its idle raised position and which are respectively connected with said boxes by the rods 45 and flexible connectors 46, which latter extend over the sheaves 47 journaled in the sheave frames 48 mounted on said cap plate 7. Said counter-shaft 20 is arranged to be lowered into operative position by the rocker frame 50 which, is mounted for oscillation in the bracket 52, as best shown in Fig. IV, and connected by the parallel links 53 with said yoke bar 22; said rocker frame 50 being conveniently drawn down by the pedal lever 56 to which it is connected by the link 57. Said lever 56 is fulcrumed at 58 on the cross bar 59 connecting said legs 2 and 3.

As indicated in Fig. VI; said main shaft 9 carries the expansible chuck comprising the head 60 in dovetailed engagement with the opposed movable semicircular jaws 61 and 62 which are normally pressed toward each other by the springs 63 bearing against the screw plugs 64 at the outer ends of the slots 65 in the head 60 and against the studs 66 extending into said slots from said jaws.

As best shown in Fig. V; said jaws are arranged to be separated within and thus rotatably engage the bellows rings 67 and 68, which are best shown in Fig. VIII. Such separation is effected by rotation of the conical wedge nut 69 which is in threaded engagement with said shaft 9 and provided with the hand wheel 70.

As best shown in Fig. V; said jaws 61 and 62 have circumferential rims 72 against which the flange 73 of said ring 67 abuts and against which it is held in operative position by the latch levers 74 which are fulcrumed at 75 in connection with the studs 76 which are rigidly mounted in said head 60 and carry at their outer ends the removable annular plate 77 which normally retains the chuck jaws 61 and 62 in operative relation with said head 60. Said latch levers have rollers 78 for engagement with the cams 79 on the ring 80, by which they are thrust into position to hold the rings 67 by engagement with the bead edges 81 of said rings, as shown in Fig. V, but have springs 82 by which they are pressed inwardly to release the rings 67 when said rollers 78 are released by said cams 79.

Said chuck jaws 61 and 62 have radially reciprocatory stop plungers 85 which are arranged to be projected, as shown in Figs. V and XII, by the cams 86 on said ring 80 bearing against the rollers 87 of said plungers, but are arranged to be thrust inwardly by their springs 89, when released by said cams 86. The operative position of the rings 68 is determined by the abutment of their bead edges 91 against said plungers 85, as shown in Fig. V. Said cam ring 80 is provided with the handle 93 projecting through the slot 94 in the chuck jaw 61, as shown in Fig. V, whereby said ring may be manually turned clockwise in the chuck to thrust said latch levers 74 and stop plungers 85 outwardly to their operative position, or anti-clockwise to permit said levers and plungers to be withdrawn, by their respective springs, within the perimeter of said chuck, to permit the bellows rings 67 and 68 to be shifted to and from their operative position on said chuck.

The tubular bellows web 97, which is conveniently formed of a strip of leather having its ends sewed together, is slipped over the hand wheel 70 and hung upon the rings 67 and 68 encircling the chuck above described, as shown in Fig. V, preliminary to the plaiting operation. In order to secure said tubular bellows web upon said rings as it is plaited, I prefer to wrap respective cords 98 and 99 around it in registry with the respective rings 67 and 68. Said cords are conveniently wound upon reels from which they extend upwardly, as indicated at the left hand side of Fig. IV, and are drawn through a series of tension devices by the operation of the machine hereinafter described. Said tension devices include respective pairs of guide rollers 101 between which the weighted rollers 102 hang upon the respective cords, in tubes 103 which are stationary upon the machine frame and which have at the bottom thereof plungers 104 by which said rollers 102 may be manually raised when it is desired to manipulate the cords with respect thereto. Said cords pass thence around respective grooved wheels 106, each cord being wrapped once around each of four such wheels in succession. Said wheels 106 are operatively connected, in pairs, with respective gears 107 which are intermeshed as shown in Fig. IV, and carried upon respective shafts 108 which are journaled in brackets 109 which are stationary upon the machine frame. The terminal one of said shafts 108 is provided with the hand wheel 111, shown in Figs. I and IV, by which the entire train of wheels 106 and 107 may be conveniently turned by the operator when it is desired to adjust the cords independently of the automatic feeding operation thereof hereinafter described. Said cords 98 and 99 pass from the terminal grooved wheels 106 downwardly, as shown in Figs. I and IV, between additional tension devices including springs 114 which are opposed by angle plates 115. Said cords pass thence around respective guide rollers 116 carried by the arm 117 which normally stands in the position shown in Figs. I and IV, but is fulcrumed at 118 upon the bracket 119 so that it may be swung to the right, with reference to Fig. IV, out of the way of the operator who sits facing the side of the chuck shown in Fig. I. Said cords pass from said guide rollers 116 to a device by which their ends are gripped and carried in proper relation to said bellows tube 97.

Said cord gripping mechanism, which is merely indicated in Fig. I, is shown on a larger scale in Fig. V and in detail in Figs. XIV to XVI inclusive and includes outer, relatively stationary, jaws 121 which are opposed by relatively movable jaws 122 fulcrumed at 123 in the cross head 124 in which are journaled respective crank shafts 125 having eccentric studs 126 engaged in the recesses 127 in said jaws 122, as shown in Figs. XIV and XVI. Said crank shafts 125 are respectively provided with handles 129 which may be manually turned from the position shown in Fig. V to the position shown in Figs. XIV to XVI inclusive, to grip the ends of said cords 98 and 99 between the opposed jaws 121 and 122 as shown in Fig. XIV. Said cross head 124 is normally in the position shown in Fig. V to present said jaws in close relation with the bellows tube 97; in which position it is detained by the plunger 131 provided with the spring 132, shown in Fig. XVI, which normally maintains it in engagement with the socket 133, in the bracket 134. However, said cross head 124 is mounted to reciprocate upon said bracket 134 and, at the convenience of the operator, may be moved further away from said chuck (radially with respect to the axis of the latter), to a position in which it is detained by engagement of said plunger 131 in the socket 135 in said bracket, indicated in dotted lines in Fig. XIV.

Said bracket 134, which supports the device for gripping the ends of the cords 98 and 99 as above described is rigidly connected with the annular gear 136, which is supported concentrically with respect to the axis of the chuck in the bearing 137 shown in Fig. IV, which is in rigid relation with the machine frame. The sole function of said annular gear 136 is to support the above described means for gripping the ends of the cords in proper relation with the bellows elements carried by the chuck as above described, so that the ends of the cords are carried around with said chuck, and said gear 136 is caused to turn with the shaft 9 of said chuck as if directly connected therewith; said gear being in mesh with the pinion 139 on the counter-shaft 140 journaled in the frame bracket 141, shown in Fig. IV, and said shaft 140 also having the pinion 143 engaging the gear 144, which is the same size as said annular gear 136 and rigidly connected with said shaft 9 as shown in Fig. I.

In order to instantly stop the turning movement of said chuck and cord gripping mechanism when the pedal lever 38 is released, I provide said shaft 9 with the drum 146, indicated in Fig. I, embraced by the opposed semicircular straps 147 pivoted on the stud 148 on the standard 5; said straps being arranged to frictionally engage said drum with any desired degree of pressure determined by the adjustment of the bolt 150.

The counter-shaft 20 has rigidly mounted thereon two oppositely counterpart plaiting disks 151 each carrying a circumferential series of plaiting blades 153 mounted to radially reciprocate in respective slots 155, as best shown in Fig. VI. Said blades are normally projected by their respective springs 157, shown at the upper portion of Fig. V, to an extent limited by engagement of their respective lugs 158 with the rings 159 which are detachably connected with said disks by the screws 160 shown in Fig. VI; said blades being retained in said slots by the cap plates 162 detachably secured to the respective disks by the screws 164 shown in Fig. IV. When said shaft 20 is lowered to present said plaiting disks 151 in the operative position shown, said blades 153 are successively forced inwardly by engagement of their points 166 with the tubular bellows web 97 which overlies the bellows rings 67 and 68 as shown in Fig. V, so that, as best shown in Fig. VII, said blades 153 first engage said web at their maximum radial extent and in such inclined relation with the peripheries of said rings as to include a greater circumferential length of said web between the points of adjoining blades than the distance between said blade points when said disks are turned, by the shaft 20, to carry the blades successively to radial relation with the axis of said chuck. As shown in Fig. X I provide each of said blades 153 with blunt shoulders 167 to prevent its sharp point 166 from indenting the leather tube 97 deep enough to cut it. Therefore, as said disks 151 are thus turned, the axially opposite edges of said tubular web 97 are corrugated, as shown in Fig. VII, and bound by said cords 98 and 99 as shown in Figs. VIII and IX which are wound around the plaited regions of said web by the rotation of said chuck and cord gripping mechanism.

It is to be noted that the plaiting blades 153 engage each web 97 during but one revolution of the chuck, after which, the pedal 56 being released, the plaiting disks 151 are uplifted to inoperative position by the weights 43.

Said plaiting disks are arranged to be maintained in their lowered operative position, shown in the drawings, by the trip lever 168 which is fulcrumed at 169 upon the machine frame and has the projection 170 which engages the upper edge of said pedal lever 56 when said trip lever 168 is held in the position shown in Fig. I by its spring 171. Said pedal lever 56 is released and the plaiting disks permitted to rise to their inoperative position, by shifting the trip lever 168 to the right with reference to Fig. I, against the tension of said spring 171 which, when said lever 168 is released, returns it to the position shown in Fig. I to automatically engage and hold down said pedal lever 56 when the latter is again depressed.

The relative operative position of said shafts 9 and 20 and, consequently, the relation of the plaiting disks 151 to the tube 97, may be variably determined by adjustment of the turn buckle 174, which connects the upper and lower sections of the link 57 and which is prevented from accidental rotation by the jam nuts 175 shown in Fig. I.

As it is desirable to withdraw each blade 153 from the tube 97 as it effects its plaiting operation; I prefer to provide each of the plaiting mechanisms with blade retracting mechanism such as indicated in the drawings and shown in detail in Figs. VI, XVII, XVIII and XIX, each including a cam 177 up which said blades 153 ride upon their lugs 158, (as indicated in dotted lines in Fig. VII) during their plaiting operation. Said cam 177 is supplemented by the cam 178 on which said blades 153 ride upon their lugs 158, as they are thrust radially outward by their respective springs 157, as shown in Fig. VI. Of course, the diametrical separation of said chuck jaws 61 and 62 to engage the bellows rings 67 and 68 above described, renders the perimeter of the chuck of unequal radius, and as it is desirable to have each pair of cams 177 maintained at the same distance from the surface of the bellows tube 97 while the latter is being plaited, so as to properly retract the plaiting blades 153, I prefer to provide said cams 177 with roller carriages 180 having respective pairs of rollers 182 bearing upon the adjacent perimeter of the chuck jaws, as indicated in Figs. V and XVII; said cams 177 being loosely supported so that they are automatically adjusted in correspondence with the variations in the radius of the chuck, under pressure of the springs 157 of the plaiting blades 153. Said cams 178 are also conveniently provided with roller carriages 180 having respective pairs of rollers 183. As indicated in Figs. XVII to XIX inclusive, the cam 177 is adjustably connected, by the screw 185, to the block 186 which is free to slide in the bracket 187 which is adjustably rigidly connected with the hanger 189. As shown in Figs. I and V, said hanger 189 is hung upon said shaft 20 and has the slide bar 190 arranged to reciprocate in the upper part of the machine frame to maintain said cams 177 and 178 in radial relation with said chuck. The cam 178, shown in Fig. XVII, is preferably rigidly connected with said bracket 187 and has the roller 192, journaled on the screw 193, to minimize the friction upon the blade lugs 158 in passing from said cam 177 to said cam 178. The other pair of cams 177 and 178 have their bracket 187 adjustably rigidly connected with the hanger 195 which, as shown in Figs. I and V depends from said shaft 20 and has the slide bar 196 mounted to reciprocate in the bearing 197 on the standard 4 so as to maintain said cams in proper radial relation with said chuck.

I find it convenient to employ a guide for the edge of the bellows tube 97 which is indicated at 200 in Figs. I and VII and shown in detail in Fig. XI. Said guide is bifurcated at its end to receive said bellows tube and has the flange 201 against which the edge of said tube abuts as indicated in Fig. VII. Said guide 200 is adjustable to and from its operative position upon the bracket 203 which is rigidly connected with the frame standard 4 and has the slot 204 for the bolt 205 which extends through the flange 206 on said guide and has the T head 207 beneath said bracket, which head is engaged in the groove 208 when said guide is held in its operative position by said bolt 205 and its nut 209. However, said guide 200 and its appurtenances may be omitted and said tube 97 properly directed, in the position shown in Fig. V, entirely by hand.

The mechanism above described is operated as follows:—The chuck jaws 61 and 62 being contracted to less diameter than the bellows rings, and the cord clamping mechanism being vertically above the chuck as shown in Fig. V; the inner bellows ring 67 is slipped over said chuck jaws until its flange 73 abuts against the circumferential rims 72 of said jaws. The stops 74 and 85 are then thrust radially outward by turning the cam ring 80 clockwise by its handle 93. The outer bellows ring 68 is then slipped over the chuck jaws until it abuts against the stops 85. Whereupon, said jaws 61 and 62 are expanded, to hold both of said bellows rings, by turning the nut 69 on the shaft 9 clockwise, by the hand wheel 70. The bellows tube 97 is then sliped over the hand wheel 70 and hung upon the rings 67 and 68 encircling the chuck as shown in Fig. V and, if the guide 200 is employed, the edge of said tube is fitted in the bifurcated end of said guide as shown in Fig. VII. The free ends of both cords 98 and 99, pendent from the tension devices 114, are drawn rearwardly, conveniently by the left hand of the operator, and between the stationary jaws 121 and movable jaws 122 of the cord clamping mechanism shown in detail in Fig. XIV. Said cords are then clamped by turning their respective levers 129. The pedal 56 is then depressed to lower the plaiter disks 151 to operative position, and the pedal 38 then depressed to throw the clutch 29 to turn the chuck and bellows rings aforesaid by the shaft 9, anti-clockwise, approximately 330 degrees. Whereupon, the pedal 38 is released to stop the chuck. The machine is thus stopped because as the chuck has been thus turned and the bellows tube 97 plaited and bound by the cords wrapped thereon as indicated in Fig. IX, there is apt to be a slack bight of said tube between the region where the plaiter blades 153 engage the leather as indicated at the right hand side of Fig. VII, and the cord clamping device, (not shown in Fig. VII) then standing at 30 degrees toward the right in said figure from its original vertically radial position (shown in Figs. V and XV) with respect to the chuck and such bight of the tube 97 is conveniently drawn forward under said cords 98 and 99, by claw tools manipulated with both hands of the operator, so that such slack may be so placed that it may be properly gathered and plaited during the completion of the first revolution of the chuck. While the chuck and the cord clamping device are thus stationary, the free ends of the cords 98 and 99, extending rearwardly from the cord clamping jaws 121 and 122 are then manually turned outwardly, by the respective hands of the operator, to a position parallel with the axis of the chuck so that during the successive revolutions of the chuck, said ends may be bound down upon the bellows tube 97 by the succeeding convolutions of the cords. Pedal 38 is then depressed to throw the clutch 29 to turn the chuck to complete its first revolution. Whereupon, the trip lever 168 is shifted to release the pedal 56 and allow the plaiting mechanism carried by the shaft 20 to be raised by the counterweights 43 and the chuck is permitted to turn three more revolutions so that there are four convolutions of the cords 98 and 99 wrapped upon said tube 97 to hold the same upon said rings 67 and 68. Whereupon, the pedal 38 is released to stop the chuck with the cord clamping mechanism in its original vertical radial position with respect to the chuck as indicated in Fig. V. During the three revolutions of the chuck subsequent to the first revolution in which the bellows tube 97 is plaited, I prefer to rotate the chuck at a higher speed than during the plaiting operation and this is conveniently effected by overhead mechanism, not shown, by which the belt leading to the step pulley 32 is driven at higher speed than during the plaiting operation. However, upon completion of the four revolutions of the chuck above described, the clamping jaws 122 by which the ends of the cord have been continuously secured, are released by turning the lever 129, with both hands, and the free ends of the cords 98 and 99 are pulled rearwardly, by both ends, and manipulated to form three half hitches by turning the cord ends inwardly, over the taut portions thereof extending to the guide rollers 116, thence outwardly under said taut portions of the cord and returning said ends over said cords, rearwardly, through the bights of the cords thus formed. The ends of the cords are then drawn rearwardly to tighten said hitches upon said taut portions of the cords and, conveniently, by a bifurcated claw tool, applied successively to the ends of the respective cords, with both hands. The chuck stop cam ring 80 is then turned anti-clockwise to withdraw said stops 74 and 85, to release said rings 67 and 68. The horizontal bar 117 carrying the cord guide rollers 116 is then swung outwardly approximately 130 degrees on its fulcrum 118, and the terminal cord tension shaft 108 manually turned one-half revolution, by the hand wheel 111, so that all of the tension shafts are turned to slacken the cords 98 and 99 sufficiently to permit the removal of the bellows from the chuck. The chuck is then contracted by anti-clockwise movement of the hand wheel 70, by which the conical wedge nut 69 is turned, and the bellows removed from the chuck and shifted to the lap of the operator, conveniently by the left hand. The free ends of the cords 98 and 99 and the portions thereof leading to the guide rollers 116 are raised together, conveniently by the left hand of the operator, and cut close to the knotted portions thereof with shears held in the operator's right hand, thus completing a bellows as shown in Fig. VIII.

The sole purpose of the tension devices including the grooved wheels 106 on the shafts 108 is to maintain the cords 98 and 99 tight while they are being wrapped upon the bellows tubes 97, and the purpose of the tension springs 114 is to prevent relaxation of the portions of the cords engaged by said tension devices, when the cords are cut as above described. However, it is to be understood that other suitable tension devices may be employed. Therefore, I do not desire to limit myself to the precise details of construction and arrangement herein set forth, as it is obvious that various modifications may be made therein without departing from the essential features of my invention as defined in the appended claims.

I claim:—

1. The combination with a rotary chuck having means arranged to detachably hold two rings in spaced relation and support a flexible tube encircling said rings; of plaiting mechanism including a shaft parallel with the axis of said chuck and movable toward and away from said chuck, means on said shaft carrying two circumferential series of radially reciprocatory blades respectively adapted to register with the rings on said chuck, and means arranged to shift said shaft to engage said blades with said tube; whereby said web is gathered to form plaits between said blades and thus contracted on said rings, when said chuck is turned; means arranged to wrap binder cords around the plaited portions of said tube, respectively in registry with said rings, including an annular gear encircling said chuck, in spaced relation therewith, between said series of blades, and carrying means arranged to detachably grip the ends of the respective cords; means operatively connecting said annular gear and chuck, arranged to turn them simultaneously in the same direction; and means operatively connecting said shaft and chuck arranged to turn them in opposite directions during said plaiting operation.

2. The combination with two circular disks in spaced relation upon a common axis and each having a series of slots; of two circumferential series of plaiting blades mounted to reciprocate radially in said slots; means arranged to normally thrust said blades outwardly; means arranged to support a tubular flexible web in position to be plaited by said blades, including a chuck comprising radially separable jaws; means normally tending to contract said chuck; means arranged to expand said chuck; means arranged to detain two rings on said chuck, respectively in registry with said two series of plaiting blades, including two circumferential series of stop elements adapted to move toward and away from the axis of said chuck, means normally tending to thrust said stop elements toward the axis of said chuck, means arranged to thrust said stop elements outwardly, including a cam ring mounted to turn in said chuck concentrically with respect to the axis thereof; means arranged to wrap binder cords around the plaited portions of said web, including an annular gear encircling said chuck, between said plaiting disks and carrying means arranged to detachably grip the ends of the respective cords; and means operatively connecting said annular gear and chuck, whereby they may be rotated simultaneously in the same direction.

3. The combination with two circular disks in spaced relation upon a common axis and each having a series of slots; of two circumferential series of plaiting blades mounted to reciprocate radially in said slots; means arranged to normally thrust said blades outwardly; means arranged to support a tubular flexible web in position to be plaited by said blades, including a chuck comprising radially separable jaws; means normally tending to contract said chuck; means arranged to expand said chuck; and means arranged to detain two rings on said chuck, respectively in registry with said two series of plaiting blades, including two circumferential series of stop elements adapted to move toward and away from the axis of said chuck, means normally tending to thrust said stop elements toward the axis of said chuck, and means arranged to thrust said stop elements outwardly, including a cam ring mounted to turn in said chuck concentrically with respect to the axis thereof.

4. The combination with two circular disks in spaced relation upon a common axis and each having a series of slots; of two circumferential series of plaiting blades mounted to reciprocate radially in said slots; means arranged to normally thrust said blades outwardly; means arranged to support a tubular flexible web in position to be plaited by said blades, including a chuck comprising radially separable jaws; means normally tending to contract said chuck; means arranged to expand said chuck; and means arranged to detain two rings on said chuck, respectively in registry with said two series of plaiting blades, including two circumferential series of stop elements adapted to move toward and away from the axis of said chuck, means normally tending to thrust said stop elements toward the axis of said chuck, means arranged to thrust said stop elements outwardly.

5. The combination with a chuck comprising radially separable jaws; of means arranged to hold two rings encircling said jaws in predetermined spaced relation, including two circumferential series of stop elements mounted to move toward and away from the axis of said chuck and each having a spring tending to normally press it toward the axis of said chuck, a cam ring mounted to turn in said chuck, concentrically with the axis thereof, whereby said stop elements may be thrust outwardly, and means arranged to expand said chuck in engagement with said encircling rings.

6. The combination with a chuck comprising radially separable jaws; of means arranged to hold two rings encircling said jaws in predetermined spaced relation, including two circumferential series of stop elements movable to and from operative position, each having a spring tending to shift it to inoperative position, cams in said chuck, whereby said stop elements may be shifted into operative position, and means arranged to expand said chuck in engagement with said encircling rings.

7. The combination with a chuck comprising radially separable jaws; of means arranged to hold two rings encircling said jaws in predetermined spaced relation, including two crcumferential series of stop elements movable to and from operative position, resilient means tending to shift said elements to inoperative position, cam means in said chuck, whereby said stop elements may be shifted into operative position, and means arranged to expand said chuck in engagement with said encircling rings.

8. The combination with a chuck comprising radially separable jaws; of means arranged to hold a ring encircling said jaws, including a circumferential series of stop elements mounted to move toward and away from the axis of said chuck, and each having a spring tending to normally press it toward the axis of said chuck, a cam ring mounted to turn in said chuck, concentrically with the axis thereof, whereby said stop elements may be thrust outwardly, and means arranged to expand said chuck in engagement with said encircling ring.

9. The combination with a chuck comprising radially separable jaws; of means arranged to hold a ring encirclng said jaws, including a circumferential series of stop elements movable to and from operative position, each having a spring tending to shift it to inoperative position, cams in said chuck, whereby said stop elements may be shifted into operative position, and means arranged to expand said chuck in engagement with said encircling rings.

10. The combination with a chuck comprising radially separable jaws; of means arranged to hold a ring encircling said jaws, including a circumferential series of stop elements movable to and from operative position, resilient means tending to shift said elements to inoperative position, cam means in said chuck, whereby said stop elements may be shifted into operative position, and means arranged to expand said chuck in engagement with said encircling rings.

11. The combination with a chuck comprising radially separable jaws; of means normally tending to contract said chuck; and means arranged to expand said chuck; means arranged to detain two rings on said chuck in predetermined spaced relation, including two cicumferential series of stop elements adapted to move toward and away from the axis of said chuck, one series consisting of levers and the other of radial plungers, means normally tending to thrust said stop elements toward the axis of said chuck, including springs respectively local to each element, and means arranged to thrust said stop elements outwardly, including a cam ring mounted to turn in said chuck concentrically with respect to the axis thereof and carrying two circumferential series of cams respectively registering with said elements.

12. The combination with a chuck comprising radially separable jaws; of means arranged to expand said chuck; means arranged to detain two rings on said chuck in predetermined spaced relation, including two curcumferential series of stop elements adapted to move toward and away from the axis of said chuck, one series consisting of levers and the other of radial plungers, means normally tending to thrust said stop elements toward the axis of said chuck, including springs respectively local to each element, and means arranged to thrust said stop elements outwardly, including a cam ring mounted to turn in said chuck concentrically with respect to the axis thereof and carrying two circumferential series of cams respectively registering with said elements.

13. The combination with a chuck comprising radially separable jaws; of means normally tending to contract said chuck; and means arranged to expand said chuck; means arranged to detain two rings on said chuck in predetermined spaced relation, including two circumferential series of stop elements adapted to move toward and away from the axis of said chuck, means normally tending to thrust said stop elements toward the axis of said chuck, including springs respectively local to each element, and means arranged to thrust said stop elements outwardly, including a cam ring mounted to turn in said chuck concentrically with respect to the axis thereof and carrying two circumferential series of cams respectively registering with said elements.

14. The combination with a chuck comprising radially separable jaws; of means normally tending to contract said chuck; and means arranged to expand said chuck; means arranged to detain two rings on said chuck in predetermined spaced relation, including two circumferential series of stop elements adapted to move toward and away from the axis of said chuck, one series consisting of levers and the other of radial plungers, and means arranged to thrust said stop elements outwardly, including a cam ring mounted to turn in said chuck concentrically with respect to the axis thereof and carrying two circumferential series of cams respectively registering with said elements.

15. The combination with a chuck comprising radially separable jaws; of means arranged to expand said chuck; means arranged to detain two rings on said chuck in predetermined spaced relation, including two circumferential series of stop elements adapted to move toward and away from the axis of said chuck, one series consisting of levers and the other of radial plungers, and means arranged to thrust said stop elements outwardly, including a cam ring mounted to turn in said chuck concentrically with respect to the axis thereof and carrying two circumferential series of cams respectively registering with said elements.

16. The combination with a chuck comprising radially separable jaws; of means normally tending to contract said chuck; and means arranged to expand said chuck; means arranged to detain two rings on said chuck in predetermined spaced relation, including two circumferential series of stop elements adapted to move toward and away from the axis of said chuck, and means arranged to thrust said stop elements outwardly, including a cam ring mounted to turn in said chuck concentrically with respect to the axis thereof and carrying two circumferential series of cams respectively registering with said elements.

17. The combination with a chuck; of means arranged to detain two rings on said chuck in predetermined spaced relation, including two circumferential series of stop elements adapted to move toward and away from the axis of said chuck, one series consisting of levers and the other of radial plungers, and means arranged to thrust said stop elements outwardly, including a cam ring mounted to turn in said chuck concentrically with respect to the axis thereof and carrying two circumferential series of cams respectively registering with said elements.

18. The combination with a chuck; of means arranged to detain two rings on said chuck in predetermined spaced relation, including two circumferential series of stop elements adapted to move toward and away from the axis of said chuck, and means arranged to thrust said stop elements outwardly, including a cam ring mounted to turn in said chuck concentrically with respect to the axis thereof and carrying two circumferential series of cams respectively registering with said elements.

19. The combination with a chuck comprising radially separable jaws; of means normally tending to contract said chuck; and means arranged to expand said chuck; means arranged to detain two rings on said chuck in predetermined spaced relation, including two circumferential series of stop elements adapted to move toward and away from the axis of said chuck, and means arranged to move said elements, including a cam ring mounted to turn in said chuck concentrically with respect to the axis thereof and carrying two circumferential series of cams respectively registering with said elements.

20. The combination with a chuck comprising radially separable jaws; of means arranged to expand said chuck; means arranged to detain two rings on said chuck in predetermined spaced relation, including two circumferential series of stop elements adapted to move toward and away from the axis of said chuck, and means arranged to move said elements, including a cam ring mounted to turn in said chuck concentrically with respect to the axis thereof and carrying two circumferential series of cams respectively registering with said elements.

21. The combination with a chuck; of means arranged to detain two rings on said chuck in predetermined spaced relation, including two circumferential series of stop elements, and means arranged to move said elements, including a cam ring carrying two circumferential series of cams respectively registering with said elements.

22. The combination with a chuck comprising radially separable jaws; of means normally tending to contract said chuck; and means arranged to expand said chuck; means arranged to detain a ring on said chuck including a circumferential flange on said jaws, a series of stop elements adapted to move toward and away from said flange, and means arranged to move said elements, including a cam ring mounted to turn in said chuck concentrically with respect to the axis thereof and carrying a circumferential series of cams respectively registering with said elements.

23. The combination with a chuck comprising radially separable jaws; of means arranged to expand said chuck; means arranged to detain a ring on said chuck in predetermined spaced relation, including a circumferential flange on said jaws, a series of stop elements adapted to move toward and away from said flange, and means arranged to move said elements, including a cam ring mounted to turn in said chuck concentrically with respect to the axis thereof and carrying a circumferential series of cams respectively registering with said elements.

24. The combination with a chuck comprising radially separable jaws; of means arranged to detain a ring on said chuck in predetermined spaced relation, including a circumferential series of stop elements adapted to move toward and away from said ring, and means arranged to move said elements, including a cam ring mounted to turn in said chuck.

25. The combination with a rotary chuck; of means arranged to wrap a flexible element around said chuck, including an annular gear encircling said chuck, in spaced relation therewith, a gripping device for said element carried by said gear, means operatively connecting said chuck and gear, whereby they may be simulaneously turned in the same direction, including a gear connected to said chuck in concentric relation therewith, and a shaft extending parallel with the axis of said chuck and having two pinions respectively engaging said gears.

26. The combination with a rotary chuck; of means arranged to wrap a flexible element around said chuck, including an annular gear, a gripping device for said element carried by said gear, means operatively connecting said chuck and gear, whereby they may be simultaneously turned in the same direction, including a gear connected to said chuck in concentric relation therewith, and a shaft extending parallel with the axis of said chuck and having two pinions respectively engaging said gears.

27. The combination with a rotary chuck; of means arranged to wrap a flexible element around said chuck, including an annular gear encircling said chuck, in spaced relation therewith, a gripping device for said element carried by said gear, means operatively connecting said chuck and gear, whereby they may be simultaneously turned.

28. The combination with a chuck; of means arranged to wrap a flexible element around said chuck, including an annular gear, a gripping device for said element carried by said gear, and means arranged to turn said gear.

29. The combination with a rotary chuck; of means arranged to simultaneously wrap two cords around said chuck, in spaced relation, including an annular gear encircling said chuck, in spaced relation therewith, a cord gripping device carried by said gear, including two relatively stationary jaws, in spaced relation, two relatively movable jaws, respectively opposed to said stationary jaws, two crank shafts having eccentric pins respectively engaging said jaws, and means whereby said crank shafts may be turned to oscillate said movable jaws.

30. The combination with a rotary chuck; of means arranged to simultaneously wrap two cords around said chuck, in spaced relation, including an annular gear encircling said chuck, in spaced relation therewith, a cord gripping device carried by said gear, including two relatively stationary jaws, in spaced relation, two relatively movable jaws, respectively opposed to said stationary jaws, and means arranged to oscillate said movable jaws.

31. The combination with a chuck; of means arranged to wrap a cord around said chuck, including an annular gear encircling said chuck, a cord gripping device carried by said gear, including a stationary jaw, a movable jaw, opposed to said stationary jaw, a crank shaft having an eccentric pin engaging said jaw, and means whereby said crank shaft may be turned to oscillate said movable jaw.

32. In a plaiting mechanism, the combination with a rotary chuck for the web to be plaited; of a rotary holder; a circular series of relatively movable plaiting blades in said holder; resilient means tending to advance said blades toward said chuck; a support, independent of said chuck and holder; a cam movable on said support toward and away from said chuck and arranged to retract said blades with respect to said holder; a roller connected with said cam and arranged to bear on said chuck; and means on said blades arranged to engage said cam; whereby the operative relation of said cam to said chuck is automatically maintained during the plaiting operation.

33. In a plaiting mechanism, the combination with a rotary chuck for the web to be plaited; of a rotary holder; a circular series of relatively movable plaiting blades in said holder; resilient means tending to advance said blades toward said chuck; a support, independent of said chuck and holder; a cam movable on said support toward and away from said chuck and arranged to retract said blades with respect to said holder; and means on said blades arranged to engage said cam; whereby the operative relation of said cam to said chuck is automatically maintained during the plaiting operation.

34. In a plaiting mechanism, the combination with a rotary chuck for the web to be plaited; of a rotary holder; a circular series of relatively movable plaiting blades in said holder; resilient means tending to advance said blades toward said chuck; a cam movable toward and away from said chuck and arranged to retract said blades with respect to said holder; and means on said blades arranged to engage said cam; whereby the operative relation of said cam to said chuck is automatically maintained during the plaiting operation.

35. In a plaiting mechanism, the combination with a support for the web to be plaited; of a rotary holder; a circular series of relatively movable plaiting blades in said holder; resilient means tending to advance said blades toward said support; a cam movable toward and away from said support and arranged to retract said blades with respect to said holder; a roller connected with said cam and arranged to bear on said support; and means on said blades arranged to engage said cam; whereby the operative relation of said cam to said support is automatically maintained during the plaiting operation.

36. In a plaiting mechanism, the combination with a support for the web to be plaited; of a rotary holder; a circular series of relatively movable plaiting blades in said holder; resilient means tending to advance said blades toward said support; a cam movable toward and away from said support and arranged to retract said blades with respect to said holder; and means on said blades arranged to engage said cam; whereby the operative relation of said cam to said support is automatically maintained during the plaiting operation.

37. In a plaiting mechanism, the combination with a support for the web to be plaited; of a rotary holder; a circular series of relatively movable plaiting blades in said holder; resilient means tending to advance said blades toward said support; a cam movable toward and away from said support and arranged to retract said blades with respect to said holder; a stationary cam, arranged to coöperate with said movable cam to retract said blades; a roller at the junction of said two cams; and means on said blades arranged to successively engage said two cams; whereby the operative relation of said movable cam to said support is automatically maintained during the plaiting operation.

38. In a plaiting mechanism, the combination with a support for the web to be plaited; of a rotary holder; a circular series of relatively movable plaiting blades in said holder; resilient means tending to advance said blades toward said support; a cam movable toward and away from said support and arranged to retract said blades with respect to said holder; a stationary cam, arranged to coöperate with said movable cam to retract said blades; and means on said blades arranged to successively engage said two cams; whereby the operative relation of said movable cam to said support is automatically maintained during the plaiting operation.

39. In a plaiting mechanism, the combination with a support for the web to be plaited; of a rotary holder; a circular series of relatively movable plaiting blades in said holder; a cam movable toward and away from said support and arranged to move said blades with respect to said holder; a stationary cam, arranged to coöperate with said movable cam to retract said blades; and means on said blades arranged to successively engage said two cams; whereby the operative relation of said movable cam to said support is automatically maintained during the plaiting operation.

40. In a plaiting mechanism, the combination with a support for the web to be plaited; of a rotary holder; a circular series of relatively movable plaiting blades in said holder; a cam movable toward and away from said support and arranged to move said blades with respect to said holder; and means on said blades arranged to engage said cam; whereby the operative relation of said cam to said support is automatically maintained during the plaiting operation.

41. In a plaiting mechanism, the combination with a rotary chuck carrying the plaited web; of means arranged to simultaneously wind two cords around said chuck and web under such tension as to compress and bind the plaited portions of said web, including means arranged to turn with said chuck while gripping the ends of said cords, and tension mechanism simultaneously operative upon both cords, including pairs of rollers in spaced relation supporting the respective cords, weighted rollers suspended on the respective cords between said supporting rollers; tubular casings in which said weighted rollers are adapted to reciprocate; plungers in said casings whereby said weighted rollers may be independently manually raised to relieve said cords of their weight; a series of intermeshed gears, of the same size, pairs of grooved wheels respectively carried by said gears and adapted to be encircled by the respective cords; shafts independently supporting the respective gears; a hand wheel on the shaft of the terminal gear of said series; stationary plates traversed by said cords between the terminal pair of said grooved wheels and said cord gripping mechanism; adjustable spring plates opposed to said stationary plates and arranged to engage said cords and normally prevent relaxation of said cords upon said grooved wheels when the ends of said cords are released from said gripping mechanism; and means arranged to turn said chuck and gripping mechanism; whereby said tension devices are automatically operated by the turning movement of said chuck and gripping mechanism while maintaining said cords of uniform tension during said winding operation.

42. In a plaiting mechanism, the combination with a rotary chuck arranged to carry the plaited web; of means arranged to simultaneously wind two cords around said chuck and web under such tension as to compress and bind the plaited portions of said web, including means arranged to turn with said chuck while gripping the ends of said cords, and tension mechanism simultaneously operative upon both cords, including pairs of rollers in spaced relation supporting the respective cords, weighted rollers suspended on the respective cords between said supporting rollers; a series of intermeshed gears, pairs of grooved wheels respectively carried by said gears and adapted to be encircled by the respective cords; shafts independently supporting the respective gears; stationary plates traversed by said cords between the terminal pair of said grooved wheels and said cord gripping mechanism; adjustable spring plates opposed to said stationary plates and arranged to engage said cords and normally prevent relaxation of said cords upon said grooved wheels when the ends of said cords are released from said gripping mechanism; and means arranged to turn said chuck and gripping mechanism; whereby said tension devices are automatically operated by the turning movement of said chuck and gripping mechanism while maintaining said cords of uniform tension during said winding operation.

43. In a plaiting mechanism, the combination with a rotary chuck arranged to carry the plaited web; of means arranged to simultaneously wind two cords around said chuck and web under such tension as to compress and bind the plaited portions of said web, including means arranged to turn with said chuck while gripping the ends of said cords, and tension mechanism simultaneously operative upon both cords, including pairs of rollers in spaced relation supporting the respective cords, weighted rollers suspended on the respective cords by said supporting rollers; a series of intermeshed gears, pairs of grooved wheels respectively carried by said gears and adapted to be encircled by the respective cords; shafts independently supporting the respective gears; and means arranged to turn said chuck and gripping mechanism; whereby said tension devices are automatically operated by such turning movement while maintaining said cords of uniform tension during said winding operation.

44. In a plaiting mechanism, the combination with a rotary chuck arranged to carry the plaited web; of means arranged to simultaneously wind two cords around said chuck and web under such tension as to compress and bind the plaited portions of said web, including means arranged to turn with said chuck while gripping the ends of said cords, and tension mechanism simultaneously operative upon both cords, including a series of intermeshed gears, pairs of grooved wheels respectively carried by said gears and adapted to be encircled by the respective cords; rotary shafts independently supporting the respective gears; and means arranged to turn said chuck and gripping mechanism; whereby said tension devices are automatically operated by such turning movement while maintaining said cords of uniform tension during said winding operation.

45. In a plaiting mechanism, the combination with a rotary chuck arranged to carry the plaited web; of means arranged to simultaneously wind two cords around said chuck and web under such tension as to compress and bind the plaited portions of said web, including means arranged to turn with said chuck while gripping the ends of said cords, and tension mechanism simultaneously operative upon both cords, including a series of intermeshed gears, pairs of grooved wheels respectively carried by said gears and adapted to be encircled by the respective cords; and means arranged to turn said chuck and gripping mechanism; whereby said tension devices are automatically operated by such turning movement while maintaining said cords of uniform tension during said winding operation.

46. In a plaiting mechanism, the combination with a rotary chuck arranged to carry the plaited web; of means arranged to wind a cord around said chuck and web under such tension as to compress and bind the plaited portion of said web, including means arranged to turn with said chuck while gripping the end of said cord, and tension mechanism operative upon said cord, including a pair of rollers in spaced relation supporting said cord, a weighted roller suspended on said cord between said supporting rollers; a series of intermeshed gears; grooved wheels respectively carried by said gears and adapted to be encircled by said cord; shafts independently supporting the respective gears; a stationary plate traversed by said cord between the terminal grooved wheel and said cord gripping mechanism; an adjustable spring plate opposed to said stationary plate and arranged to engage said cord and normally prevent relaxation of said cord upon said grooved wheels when the end of said cord is released from said gripping mechanism; and means arranged to turn said chuck and gripping mechanism; whereby said tension devices are automatically operated by such turning movement while maintaining said cords of uniform tension during said winding operation.

47. In a plaiting mechanism, the combination with a rotary chuck arranged to carry the plaited web; of means arranged to wind a cord around said chuck and web under such tension as to compress and bind the plaited portion of said web, including means arranged to turn with said chuck while gripping the end of said cord, and tension mechanism operative upon said cord, including a pair of rollers in spaced relation supporting said cord, a weighted roller suspended on said cord between said supporting rollers; a series of intermeshed gears; grooved wheels respectively carried by said gears and adapted to be encircled by said cord; and means arranged to turn said chuck and gripping mechanism; whereby said tension devices are automatically operated by such turning movement while maintaining said cords of uniform tension during said winding operation.

48. In a plaiting mechanism, the combination with a rotary chuck arranged to carry the plaited web; of means arranged to wind a cord around said chuck and web under such tension as to compress and bind the plaited portion of said web, including means arranged to turn with said chuck while gripping the end of said cord, and tension mechanism operative upon said cord, including a series of intermeshed gears; grooved wheels respectively carried by said gears and adapted to be encircled by said cord; shafts independently supporting the respective gears; a stationary plate traversed by said cord between the terminal grooved wheel and said cord gripping mechanism; an adjustable spring plate opposed to said stationary plate and arranged to engage said cord and normally prevent relaxation of said cord upon said grooved wheels when the end of said cord is released from said gripping mechanism; and means arranged to turn said chuck and gripping mechanism; whereby said tension devices are automatically operated by such turning movement while maintaining said cords of uniform tension during said winding operation.

49. In a plaiting mechanism, the combination with a rotary chuck arranged to carry the plaited web; of means arranged to wind a cord around said chuck and web under such tension as to compress and bind the plaited portion of said web, including means arranged to turn with said chuck while gripping the end of said cord, and tension mechanism operative upon said cord, including a series of intermeshed gears; grooved wheels respectively carried by said gears and adapted to be encircled by said cord; and means arranged to turn said chuck and gripping mechanism; whereby said tension devices are automatically operated by such turning movement while maintaining said cords of uniform tension during said winding operation.

50. In plaiting mechanism, the combination with a rotary chuck for the web to be plaited; of a rotary holder; a circular series of relatively movable plaiting blades in said holder, each having a point for engagement with said web; means arranged to turn said chuck and holder in coöperative relation; and means limiting the indenting effect of said points on said web, including blunt shoulders on each of said blades, upon opposite sides of said points, arranged to bear upon said web during the plaiting operation.

51. In plaiting mechanism, the combination with a support for the web to be plaited; of a rotary holder; a circular series of relatively movable plaiting blades in said holder, each having a point for engagement with said web; means arranged to turn said holder in coöperative relation with said support; and means limiting the indenting effect of said points on said web, including blunt shoulders on each of said blades, upon opposite sides of said points, arranged to bear upon said web during the plaiting operation.

52. In plaiting mechanism, the combination with a support for the web to be plaited; of a series of relatively movable plaiting blades, each having a point for engagement with said web; means arranged to move said blades in coöperative relation with said support; and means limiting the indenting effect of said points on said web, including a blunt shoulder on each of said blades, arranged to bear upon said web during the plaiting operation.

53. In plaiting mechanism, the combination with a rotary chuck for the web to be plaited; of a rotary holder; a circular series of relatively movable plaiting blades in said holder, each having a point for engagement with said web; means arranged to turn said chuck and holder in coöperative relation; and means, movable with said blades, limiting the indenting effect of said points on said web.

54. In plaiting mechanism, the combination with a support for the web to be plaited; of a series of relatively movable plaiting blades, each having a point for engagement with said web; means arranged to move said blades in coöperative relation with said support; and means, movable with said blades, limiting the indenting effect of said points on said web.

55. In a plaiting mechanism, the combination with a rotary chuck for the web to be plaited; of a guide for the edge of said web having a bifurcated end to receive the edge of said web and a flange against which said edge abuts; a stationary support for said guide, having a slot and groove; and means adjustably connecting said guide with said support including a bolt fitting in said slot and having a T head arranged to engage said groove when said guide is in operative position.

56. In a plaiting mechanism, the combination with a rotary chuck for the web to be plaited; of a guide for the edge of said web having a bifurcated end to receive the edge of said web; a stationary support for said guide; and means adjustably connecting said guide with said support; whereby said guide may be shifted to and from its operative position and secured in the latter.

In testimony whereof, I have hereunto signed my name at Philadelphia, Pennsylvania, this thirtieth day of August, 1915.

CHARLES ATHERTON.

Witnesses:
SHADE E. SIMMONDS,
JOHN J. HAGERTY.

Copies of this patent may be obtained for five cents each, by addressing the "Commissioner of Patents, Washington, D. C."